United States Patent
Goodman et al.

(10) Patent No.: US 8,224,755 B2
(45) Date of Patent: Jul. 17, 2012

(54) SOCIALLY DERIVED, GRADUATED ACCESS CONTROL IN COLLABORATION ENVIRONMENTS

(75) Inventors: Brian D. Goodman, Brooklyn, NY (US); Mircea Mihaescu, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 864 days.

(21) Appl. No.: 12/168,487

(22) Filed: Jul. 7, 2008

(65) Prior Publication Data

US 2010/0005099 A1 Jan. 7, 2010

(51) Int. Cl.
*G06Q 99/00* (2006.01)
(52) U.S. Cl. .......................... 705/317; 705/319
(58) Field of Classification Search .................. 705/317, 705/1
See application file for complete search history.

(56) References Cited

U.S. PATENT DOCUMENTS

| | | |
|---|---|---|
| 6,892,179 B1 | 5/2005 | Zacharia |
| 2002/0046041 A1 | 4/2002 | Lang |
| 2006/0031483 A1 | 2/2006 | Lund et al. |
| 2007/0208940 A1 | 9/2007 | Adelman et al. |
| 2008/0082662 A1 | 4/2008 | Dandliker et al. |
| 2008/0086638 A1 | 4/2008 | Mather |
| 2008/0109244 A1* | 5/2008 | Gupta ............................. 705/1 |
| 2009/0187988 A1* | 7/2009 | Hulten et al. ................... 726/22 |
| 2009/0300720 A1* | 12/2009 | Guo et al. ......................... 726/3 |

* cited by examiner

*Primary Examiner* — Candice D Carter
*Assistant Examiner* — Ehrin Pratt
(74) *Attorney, Agent, or Firm* — Cahn & Samuels, LLP.

(57) ABSTRACT

A method for socially derived, graduated access control to a collaboration environment includes calculating a variable reputation score for a user based on a user's actions within a collaboration environment; and dynamically enabling graduated access control to the collaboration environment based on the reputation score.

23 Claims, 5 Drawing Sheets

SOCIALLY DERIVED, GRADUATED ACCESS CONTROL IN COLLABORATION ENVIRONMENTS

I. FIELD OF THE INVENTION

The present invention relates to a system and method for socially derived, graduated access control in collaboration environments.

II. BACKGROUND OF THE INVENTION

With the proliferation of the internet, anyone can obtain an identity using a free email account (e.g., HOTMAIL, GOOGLE, YAHOO) or using systems such as OpenID. In a physical, real-world environment (e.g., corporation, professional association, university), there are external physical checks to validate identities. However, in a virtual interactive space or collaboration environment, such as online communities, there are no ways to validate an identity in the traditional way using external checks.

Systems today offer what are traditionally called access controls to restrict usage of specific features and functions to a given set of users. Often access control is given as part of a social understanding, such as a role in the community. In addition, some systems allow for the creation of a static reputation and how that reputation is presented to an entity (e.g., "this site has been verified by HACKERSAFE"). Other systems define a reputation in the programmatic understanding of past interactions. For example, a connection to a specific mail server always results in error. Accordingly, the mail server has a poor reputation and is prioritized lower in the queue of mail servers to contact.

There remains a need for dynamic, granular access controls for individuals in a collaboration environment based on a socially-derived variable reputation measurement or score.

III. SUMMARY OF THE INVENTION

According to the present invention, method for socially derived, graduated access control to a collaboration environment is provided. A variable reputation score for a user is calculated based on the user's actions within a collaboration environment. Graduated access control to the collaboration environment is dynamically enabled based on the reputation score.

According to another aspect of the invention, a method for socially derived, graduated access control to a collaboration environment is provided. A variable reputation score is calculated for a user based on user participation in the collaboration environment. Graduated access for the user to the collaboration environment is dynamically enabled based on the user's reputation score.

According to another aspect of the invention, a system for socially derived, graduated access control is provided comprising an agent for dynamically calculating a reputation score in a collaboration environment and at least one client. The at least one client comprises at least one of an interface module by which users may input and exchange information in a collaboration environment; a score tool for calculating a socially derived, variable reputation score based upon measurement or analysis of user's actions within the collaboration environment; a counter for measuring the frequency of interactions and endorsements within a collaboration environment; or a verification tool for analysis of information about a user that is publicly available.

According to another aspect of the invention, a computer program product is provided comprising a computer useable medium having a computer readable program. When executed on a computer, the computer readable program causes the computer to calculate a variable reputation score for a user based on a user's actions within a collaboration environment; and enable graduated access control to the collaboration environment dynamically based on the reputation score.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the system and methods should become evident to a person of ordinary skill in the art.

V. DETAILED DESCRIPTION OF THE DRAWINGS

FIGS. 1-5 are directed to a system and method for socially derived, graduated access control in collaboration environments. According to the present invention, a socially derived, variable reputation measurement or score is used to dynamically, and in embodiments automatically, enable access, for example to at least one of restricted areas, tools, features, or functions of the collaboration environment, once higher levels of reputation are awarded to at least one user. The reputation score may be based on the at least one user's actions within the collaboration environment.

According to the present invention, a collaboration environment may be a synchronous or asynchronous virtual interactive space and may include, but is not limited to, shared web applications, shared web experiences (e.g., blogs, wikis); shared web browsing, shopping sites, banking sites; instant messaging, text messaging, online bulletin boards, shared whiteboards, shared document production, discussion forums, discussion threads, voice over IP (e.g., conference call monitoring), or the like. In embodiments, the collaboration environment may be accessed by a networked computer system. Users of the collaboration environment include, but are not limited to, people, computer applications, simulated people, automated assistants or agents (bots), devices, or any combination thereof. For clarity in the discussion below, the embodiment directed to human users is utilized.

According to the present invention, a variable reputation score for a user of a collaboration environment is calculated. As a user's reputation scores increases, he or she is dynamically and automatically allowed gradually increasing access control to at least one of restricted areas, tools, features or functions of the collaboration environment. Similarly, if a user's reputation scores decreases, his or her access control to such areas, tools, features or functions is dynamically and automatically restricted.

According to the present invention, a variable reputation measurement or score for a user is calculated based on at least one of (1) a valid e-mail address, (2) verification of user-provided data, (3) user participation in a collaboration environment, (4) endorsement of the user by other users, (5) length of user affiliation or tenure with the collaboration environment, or (6) any combination thereof. In embodiments, the reputation score includes not only validation or verification of facts (e.g., e-mail address, financial information), but also the level of trust based on a user's actions within a collaboration environment.

According to the present invention, the reputation score may comprise verification of a valid e-mail address upon a user's registration with a collaboration environment. In embodiments, the e-mail verification may be through activation of an authorized web link e-mailed to the user or may be delegated to an external party, e.g., an Internet Service Provider or employer. After a user's e-mail address is verified, the user is dynamically and automatically granted basic access to the collaboration environment. Basic or limited access allows the user to view and read information, receive e-mail or offers, and purchase products and services, for example, via telephone or from an online store, but does not allow the user to participate in or interact with other users in the collaboration environment. The verification of a valid e-mail address may constitute a percentage or point value in calculating a reputation score for the user.

The reputation score may comprise verification of user-provided data. Examples of such user-provided data include, but are not limited to, at least one of telephone number, social security number, birthday, current address, past address, shipping address, the name of the street the user grew up on, names of siblings, parents or other relatives; employment information; or financial information (e.g., credit card number). The verification of user-provided data may constitute a percentage or point value in calculating the reputation score for the user. Verification of such data will increase a user's reputation score and dynamically and automatically grants the user increased access control to the collaboration environment, for example, to participate in and interact with other users in the environment.

In embodiments, verification may occur when a user purchases a service or product or responds to an offer. The information provided by the user (e.g., credit card number) can be verified. The user-provided data may be checked against information provided earlier by the user at the time of registration with the collaboration environment. In embodiments, verification may comprise analysis of information about the user that is publicly available, for example, information located using a web search engine (e.g., GOOGLE, YAHOO); information from a social networking site (e.g., LINKEDIN, FACEBOOK, MYSPACE); or information from professional organizations, business directories, real estate records, criminal records, or the like.

The reputation score may comprise measurement or analysis of user participation in the collaboration environment. Participation may include, but is not limited to, at least one of the frequency of posting, revising, commenting on, or contributing articles, ratings, articles, blogs, or reviews; attendance online or in-person at meeting or events; the frequency of interacting with other users, for example, by e-mail or instant messaging; or how often other users or members interact with the user. The user's level of participation may constitute a percentage or point value in calculating the reputation score for the user. In embodiments, in-person participation at meetings or events may be weighted more heavily than other kinds of participation in calculating the user's reputation score.

Measurement of participation may comprise not just the frequency of, but also evaluation of, a user's contributions to the collaboration environment. For example, textual analysis of a user's contributions may be correlated with other contributions to the collaboration environment or to external texts written by the user (e.g., published papers, other blogs), thereby creating a digital fingerprint. A digital fingerprint comprises a profile or distillation of the user, the user's actions, the items being acted upon, and the content attached to those interactions. For example, given a body of text, themes and proper names can be extracted to infer a user's interests and connections to other individuals.

The reputation score may comprise measurement or analysis of endorsements or recommendations of the user by other users in the collaboration environment. For example, a second user may vouch for or recommend the user to others in the collaboration environment. The number of endorsements may be measured, as well as the corresponding reputation scores of the endorsers. Endorsements may constitute a percentage or point value in calculating the reputation score for the user.

The reputation score may comprise a measurement based on the length of a user's affiliation or tenure with the collaboration environment. The length of affiliation or tenure may constitute a percentage or point value in calculating the reputation score for the user.

As noted, the variable reputation score is calculated based on at least one of a valid e-mail address, verification of user-provided data, user participation in a collaboration environment, endorsement of the user by other users, length of user affiliation or tenure with the collaboration environment, or any combination thereof. In embodiments, the calculation of a reputation score may be a partial or progressive summation of any combination of these elements.

The socially derived, variable reputation score comprises a numeric score representative of the user's social reputation. The reputation score may be on any predetermined scale, for example, on a scale from 1 to 10 or from 1 to 100. In embodiments, each element can be evaluated apart from the others and may be weighted differently. Such weightings may be changed as desired. According to the present invention, the reputation score may be evaluated as a whole, or part of a reputation score may be evaluated, for determining access controls. In embodiments, a breakdown of the reputation score for each element contributing to the overall score may be evaluated for granting increased access control to the collaboration environment. For example, only three endorsements may be required for a user to moderate an online forum. However, the user may be new to the collaboration environment and not have points in other areas of the reputation score to allow additional forms of participation, such as voting.

In embodiments, the reputation score or elements that make up the reputation score may be affected by time. For example, regular user participation in an environment may initially result in an increased reputation score. However, if the user has not been to the environment in over a year, the reputation score may be affected. To reflect this time feature, the reputation score may comprise a decay element which adjusts automatically adjusts a reputation score based on involvement over time.

According to the present invention, the reputation score may be calculated in real-time or at predetermined scheduled intervals (e.g., hourly, daily, weekly, monthly). The reputation scores calculated for all users of the collaboration environment may be used to rank users based on reputation and trust.

In embodiments, at least one threshold for the reputation score may be implemented before allowing additional access controls to the user to ensure progression and diversity in the data. For example, an individual user may be very active in an online forum on a topic he or she is well educated on. Their participation would increase their score, potentially at a disproportionate rate. Thus, a threshold might be that individuals need to be members of the collaboration environment for one week before getting additional access control privileges or that access control privileges can only change on a weekly basis. In embodiments, another threshold might comprise clip levels, for example, it may take a specific number of endorsements before additional access privileges are allowed. Thus, the interpretation of an individual element or part of a reputation score may comprise a threshold.

In some embodiments, the reputation score is not updated to reflect the current state until a threshold is met. For example, a reputation score may require endorsements that equate to a score contribution of 50 before allowing a user to comment on another user's contributions. The reputation score contribution may only have three levels, 0, 50 and 100, wherein 50 equals 5 user endorsements. In this way, the graduation of this part of the reputation score comprises thresholds. Accordingly, the reputation score will be interpreted only after a threshold is met. In embodiments, the at least one threshold may be different for different users. For example, a second user is required to have the same reputation element be equal to 100 to comment on another user's contribution.

Figure 1:
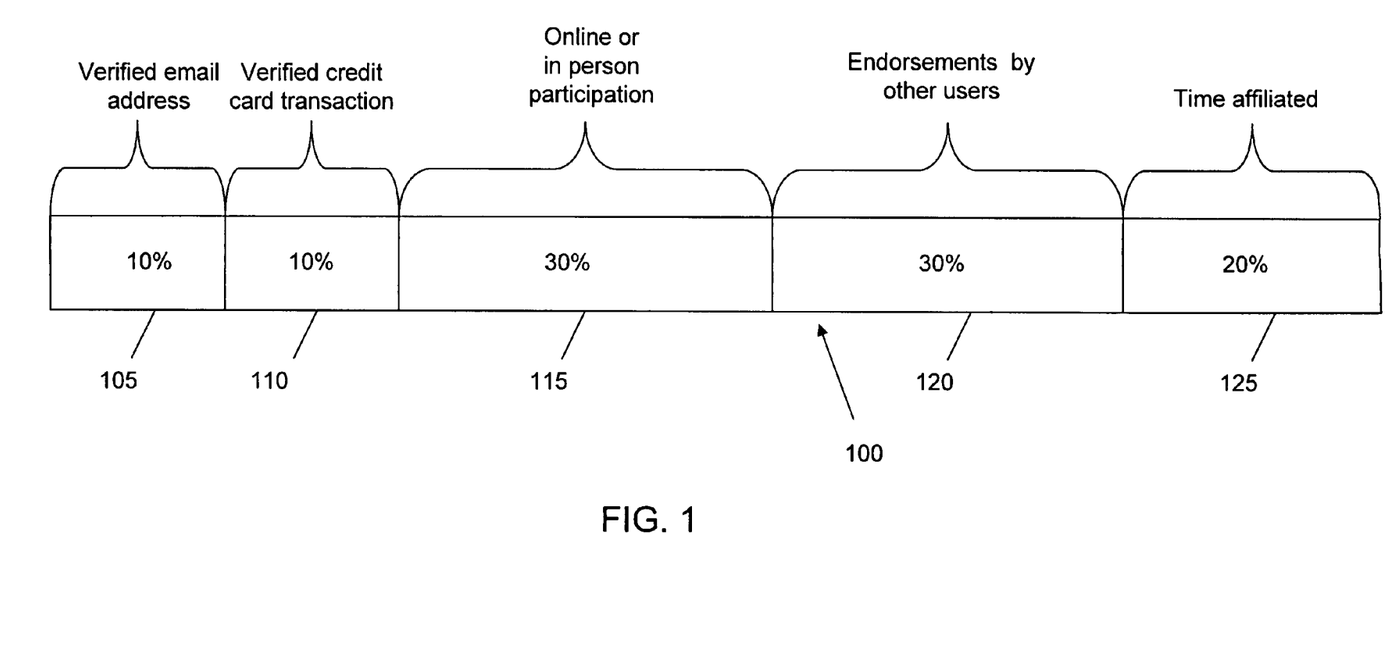
FIG. 1 illustrates exemplary elements of a reputation score according to an embodiment of the present invention.

FIG. 1 illustrates exemplary elements and their respective weightings in the calculation of a socially-derived reputation score 100 according to an embodiment of the present invention. The elements include:

1. A verified email address 105 makes up 10% of the reputation score;
2. Verified credit card transaction 110 makes up another 10%;
3. Online or in person participation 115 makes up 30%;
4. Endorsements by other users 120 makes up an addition 30%; and
5. Time affiliated with the collaboration environment 125 is the last 20%.

Figure 2:
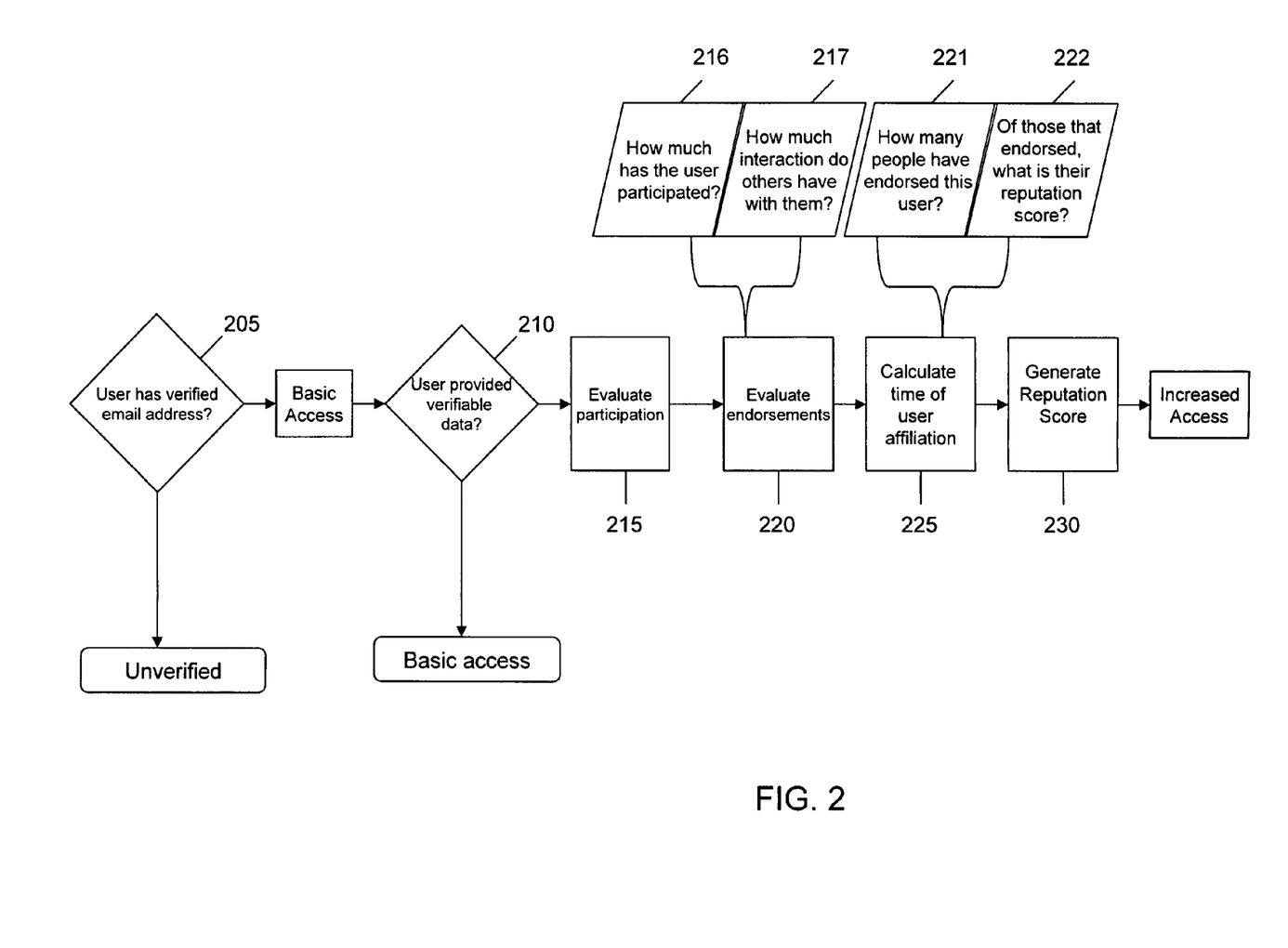
FIG. 2 illustrates a method of progressively calculating a reputation score according to an embodiment of the present invention.

FIG. 2 illustrates a method of progressively calculating a reputation score based on a user's actions within a collaboration environment according to an embodiment of the present invention. Upon registration with or an initial sign-on to a collaboration environment, a user's email address is verified 205. If the e-mail address is not verified, the user has no reputation score and is not granted any access to the collaboration environment. If the user e-mail address is verified, the user is given basic or limited access to the collaboration environment. The verification of the user's e-mail address may be given a point value, for example, 10 points in calculating the reputation score.

If the user provides verifiable data (e.g., purchased something via a credit card transaction) 210, the user's reputation score increases and the user is dynamically and automatically granted increased access to participate in the collaboration environment depending on the quantity and quality of validation. The verification of the user-provided data may be given a point value, for example, 10 points in calculating the reputation score.

The user's participation in the collaboration environment is evaluated 215. For example, how much the user participates 216 and how much interaction other users have with the user 217 may be measured. Each contribution has a different associated point value. The participation may be scaled to represent some portion of 30 points.

Evaluation of endorsing users 220 contributes a point. For example, how many people endorsed the user 221 and their respective reputation scores 222 are evaluated. Users that have higher reputation scores add additional points. The endorsement may be scaled to represent some portion of 30 points.

The user's tenure 225 is taken into account. The longer the affiliation, the more points they are awarded up to or scaled to 20 points.

Each calculation is summed and a reputation score 230 is generated. This dynamic variable reputation score may be displayed and/or may be incorporated into a system as a method for entitlement. For example, users with reputations below a score of 250 are not able to see a reporting view of an application. If their score is over 250, users automatically receive access to the reporting view.

EXAMPLE

Sidney registers with a community's online aromatherapy website. Sidney receives an email to verify her email address and account. Sidney clicks a special link in the email and is directed back to the website Sidney's reputation score is low and grants her the most basic level of access to the website's features and tools. She may read online content. She also has access to buy from an online store.

Sidney buys some aromatherapy oils from the online store and pays by a valid credit card that matches the address and phone number she entered earlier upon registration. Sidney's reputation score increases, and she is granted additional access. Sidney is now able to review products and post items to the classifieds section of the store.

Sidney registers and attends an event held at the local farmer's market. The community's program director takes attendance and validates Sidney's identification and ID. Based upon her participation, Sidney's reputation score increases. She is now able to contribute to the community blog and vote for the content displayed on the front page of the website.

Figure 3:
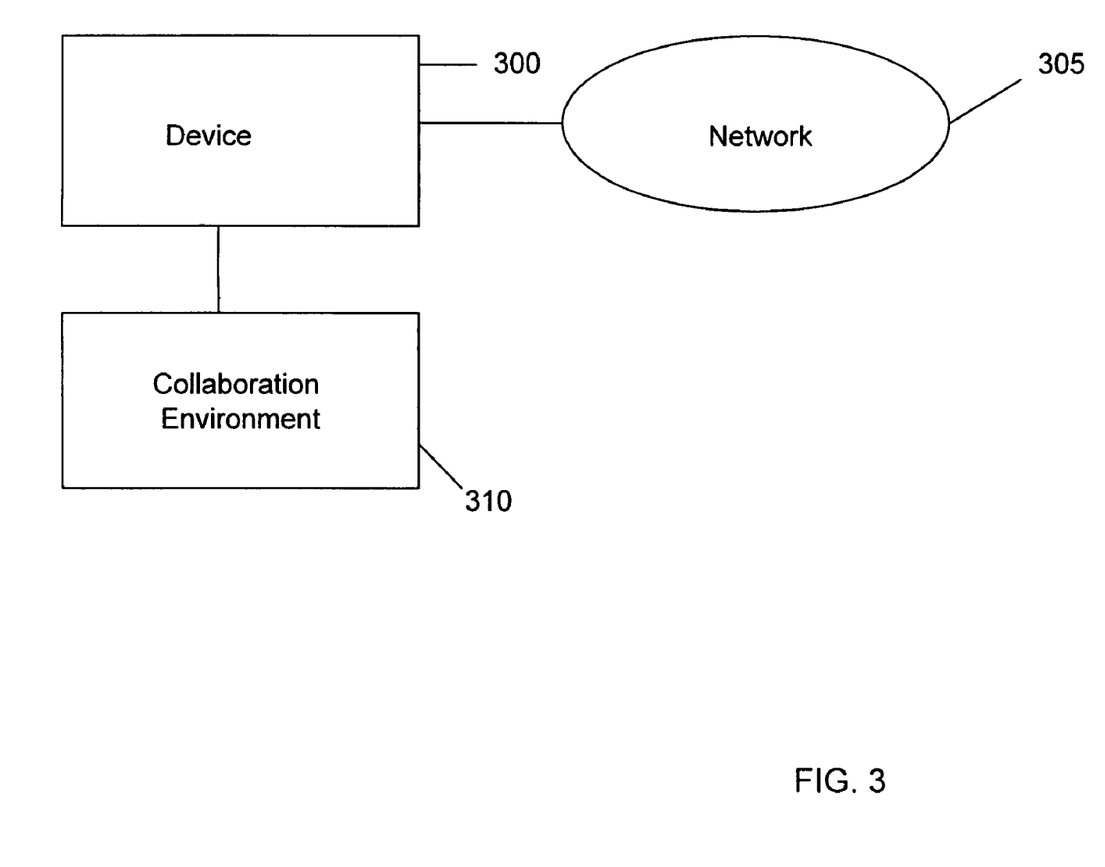
FIG. 3 is a block diagram of a system for calculating a reputation score according to an embodiment of the present invention.

FIG. 3 illustrates is a block diagram of a system according to an embodiment of the present invention. The illustrative system includes at least one electronic or digital device 300 (e.g., a personal computer, cellular telephone, personal digital assistant or PDA, game device, MP3 player, television) to access a collaboration environment. The device may be connected to a network 305 (e.g., the Internet, local area network (LAN), wide area network (WAN)). In embodiments of the invention, the system includes at least one collaboration environment 310 which may be an application residing on a server. The illustrative system is but one example, and one of ordinary skill in the art would recognize that many other variations may exist, all of which are contemplated by the invention.

Figure 4:
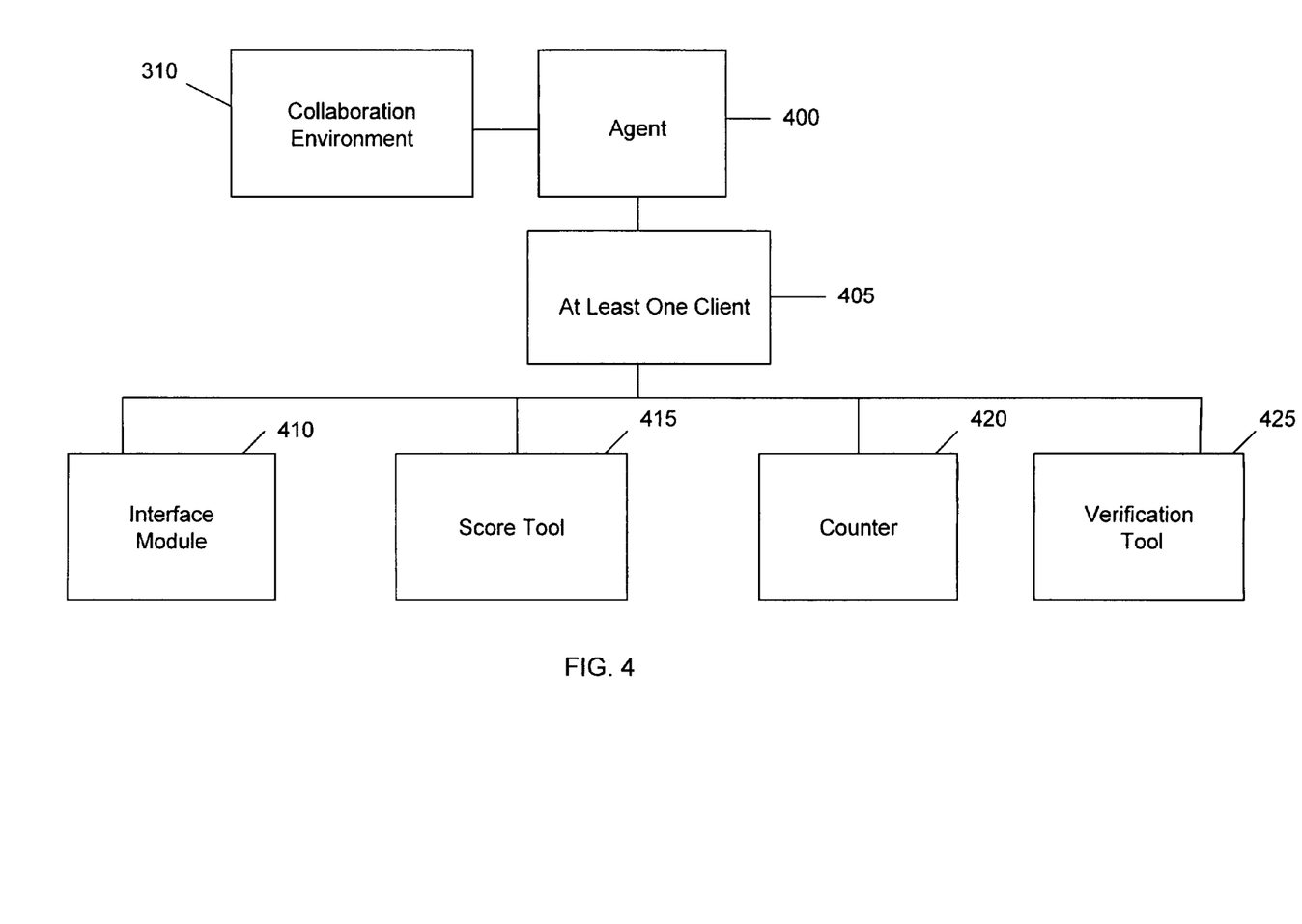
FIG. 4 is a block diagram of an exemplary agent of the system of FIG. 3.

FIG. 4 illustrates an exemplary agent 400 for dynamically calculating a reputation score in a collaboration environment which includes at least one client 405 comprising at least one of an interface module 410, for example a graphical user interface (GUI), by which users may input and exchange information in a collaboration environment; a Score Tool 415 for calculating a socially derived, variable reputation score based upon measurement or analysis of user's actions within the collaboration environment; a Counter 420 for measuring the frequency of interactions and endorsements within a collaboration environment; and a Verification Tool 425 for analysis of information about a user that is publicly available. In embodiments, the agent and its at least one client may be applications residing on at least one of the electronic or digital devices accessing the at least one collaboration environment.

Figure 5:
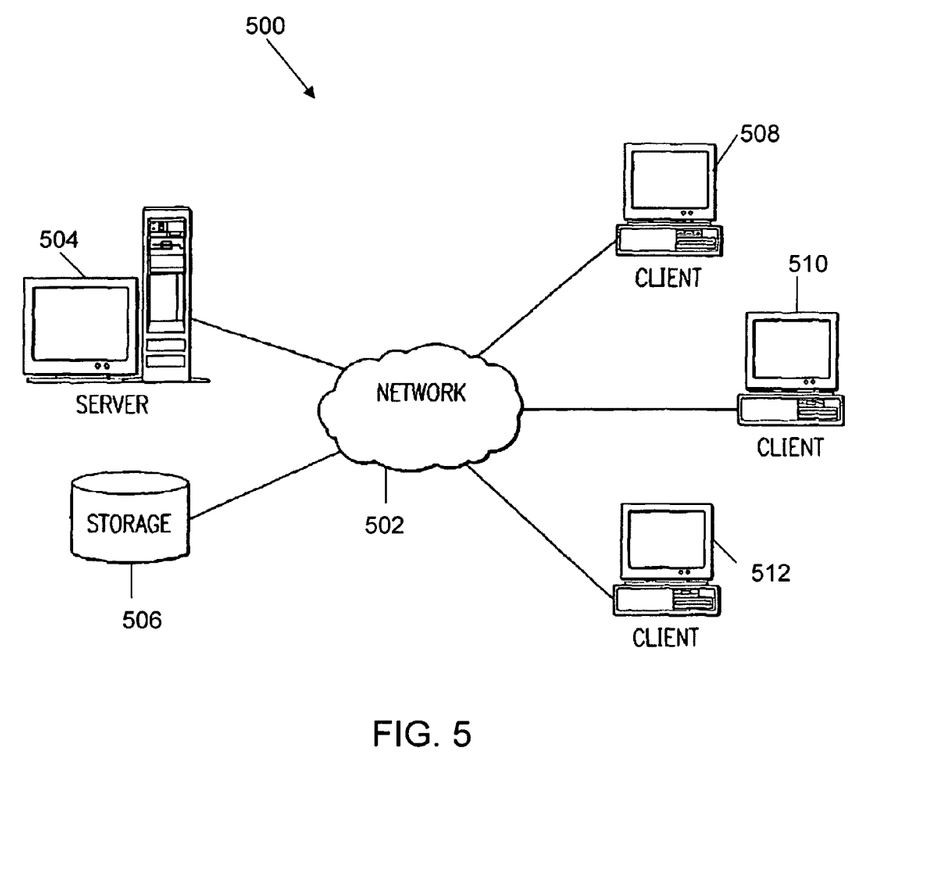
FIG. 5 is a network data processing system according to an embodiment of the present invention.

FIG. 5 illustrates an exemplary embodiment of a network data processing system in which the present invention may be implemented. Network data processing system 500 is a network of computers in which the present invention may be implemented. Network data processing system contains a network 502, which is the medium used to provide communications links between various devices and computers connected together within the network data processing system. Network 502 may include connections, such as wire, wireless communication links, or fiber optic cables.

In the illustrated example, a server 504 is connected to network 502 along with storage unit or medium 506. In addition, clients 508, 510, and 512 also are connected to network 502. Network 502 may include permanent connections, such as wire or fiber optic cables, or temporary connections made through telephone connections. The communications network 502 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 504 without departing from the scope of the present invention.

Clients 508, 510, and 512 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the illustrated example, server 504 provides data to clients 508-512. Clients 508, 510, and 512 are clients to server 504. Network data processing system 500 may include additional servers, clients, and other devices not shown. In the depicted example, network data processing system 500 might be the Internet with network 502 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 500 also may be implemented as a number of different types of networks, such as for example, an intranet, a local area network (LAN), or a wide area network (WAN). FIG. 5 is intended as an example, and not as an architectural limitation for the present invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/ or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

The invention claimed is:

1. A method for socially derived, graduated access control to a collaboration environment, comprising:
    calculating a variable reputation score for at least one user by a processor, said reputation score based on attendance in-person at a meeting or event, a valid e-mail address, verification of user-provided data, user participation in the collaboration environment, endorsement of a user by other users, and length of user affiliation or tenure with the collaboration environment; and
    dynamically enabling graduated access control to the collaboration environment based on the reputation score.

2. A method according to claim 1, wherein the collaboration environment comprises at least one of the following: shared web applications, shared web experiences; shared web browsing, shopping sites, banking sites; instant messaging, text messaging, online bulletin boards, shared whiteboards, shared document production, discussion forums, discussion threads, or voice over IP.

3. A method according to claim 1, wherein user-provided data comprises at least one of the following: telephone number, social security number, birthday, current address, past address, shipping address, the name of the street the user grew up on, names of siblings, parents or other relatives; employment information; or financial information.

4. A method according to claim 1, wherein upon verification of user-provided data, the at least one user is allowed access to participate with other users in the collaboration environment.

5. A method according to claim 1, wherein user participation in the collaboration environment comprises at least one of the following: frequency of posting, revising, commenting on, or contributing articles, comments, ratings, articles, blogs, or reviews; attendance at online meeting or events; the frequency of which the at least one user interacts with other users; or how often do other users or members interact with the at least one user.

6. A method according to claim 5, further comprising evaluating the at least one user's contributions to the collaboration environment via a textual analysis of the user's contribution with other contributions to the collaboration environment.

7. A method according to claim 1, wherein calculating the reputation score further comprises a measurement of a number of endorsements of the at least one user by other users in the collaboration environment and of reputation scores of the other users.

8. A method according to claim 1, further comprising creating a digital fingerprint for at least one user.

9. A method according to claim 1, wherein different elements of the reputation score are weighted differently.

10. A method according to claim 1, wherein at least one threshold for the reputation score is implemented before allowing additional access control.

11. A method according to claim 1, wherein the reputation score comprises a decay element which automatically adjusts the reputation score based on the at least one user's involvement over time.

12. A method according to claim 1, wherein the reputation score is calculated in real-time.

13. A method according to claim 1, comprising automatically enabling graduated access control to the collaboration environment based on the reputation score.

14. A method for socially derived, graduated access control to a collaboration environment, comprising:
    calculating a variable reputation score for a user by a processor; and
    dynamically and automatically enabling graduated access control to the collaboration environment based on the reputation score,
    wherein the variable reputation score is calculated based on:
    verification of a valid e-mail address,
    verification of user-provided data,
    evaluation of the user's contributions to the collaboration environment via a textual analysis of the user's contribution with other contributions to the collaboration environment or to external texts written by the user,
attendance in-person at a meeting or event,
endorsement of the user by other users, and
length of user affiliation or tenure with the collaboration environment.

15. A computer program product, comprising:
a computer useable non-transitory storage medium having a computer readable program, wherein the computer readable program when executed on a computer causes the computer to:
   calculate a variable reputation score for at least one user based on attendance in-person at a meeting or event, a valid e-mail address, verification of user-provided data, user participation in the collaboration environment, endorsement of a user by other users, and length of user affiliation or tenure with the collaboration environment; and
   enable graduated access control to the collaboration environment dynamically based on the reputation score.

16. A method according to claim 5, comprising evaluating the at least one user's contributions to the collaboration environment via a textual analysis of the user's contribution to external texts written by the user.

17. A method according to claim 16, wherein the external texts written by the user comprise published papers.

18. A method according to claim 1, further comprising ranking all users of the collaboration environment by reputation score.

19. A method according to claim 1, further comprising verifying user-provided data by analysis of information located on a social networking website.

20. A method according to claim 1, further comprising verifying user-provided data by analysis of information from professional organizations, business directories, real estate records, or criminal records.

21. A method according to claim 1, further comprising verifying user-provided data by analysis of information that is publicly available using a web search.

22. A method according to claim 1, wherein attendance at an in-person meeting or event is weighted more than user participation in the collaboration environment in calculating the at least one user's reputation score.

23. A method according to claim 1, further comprising: taking attendance at the in-person meeting or event; and validating the at least one user's identification.

* * * * *